United States Patent [19]

Mefford

[11] 3,898,740
[45] Aug. 12, 1975

[54] APPARATUS FOR DETERMINING THE DIAMETERS OF ROUND OBJECTS

[76] Inventor: Albert L. Mefford, 1120 E. Jones, Sapulpa, Okla. 74066

[22] Filed: Jan. 19, 1973

[21] Appl. No.: 325,212

[52] U.S. Cl. ................................................ 33/142
[51] Int. Cl. ......................... G01b 3/12; G01b 5/08
[58] Field of Search ...... 33/139, 140, 141 R, 141 E, 33/141 B, 142, 178 R, 178 E

[56] References Cited
UNITED STATES PATENTS

| | | | |
|---|---|---|---|
| 874,994 | 12/1907 | Richardson | 33/141 R |
| 1,714,009 | 5/1929 | Farmer | 33/141 R |
| 2,677,891 | 5/1954 | Hansen | 33/141 E |
| 3,172,208 | 3/1965 | Lowy | 33/142 |
| 3,378,929 | 4/1968 | Deardorff et al. | 33/141 R |

*Primary Examiner*—Richard E. Aegerter
*Assistant Examiner*—Steven L. Stephan
*Attorney, Agent, or Firm*—William S. Dorman

[57] ABSTRACT

Apparatus for measuring the diameter of a circular object, especially the internal diameter of an out-of-round pipe, comprising a measuring device having a measuring roller mounted therein wherein the measuring roller has a diameter exactly equal to a multiple or submultiple of the standard of measurement in which the diameter is to be expressed; means are provided to move the measuring wheel circumferentially exactly the same amount as the movement of the measuring device over the full circumference of the surface whose diameter is to be measured; means are provided for translating the number of revolutions of the measuring roller into the exact diametral measurement of the object.

1 Claim, 7 Drawing Figures

PATENTED AUG 12 1975
3,898,740
SHEET 1
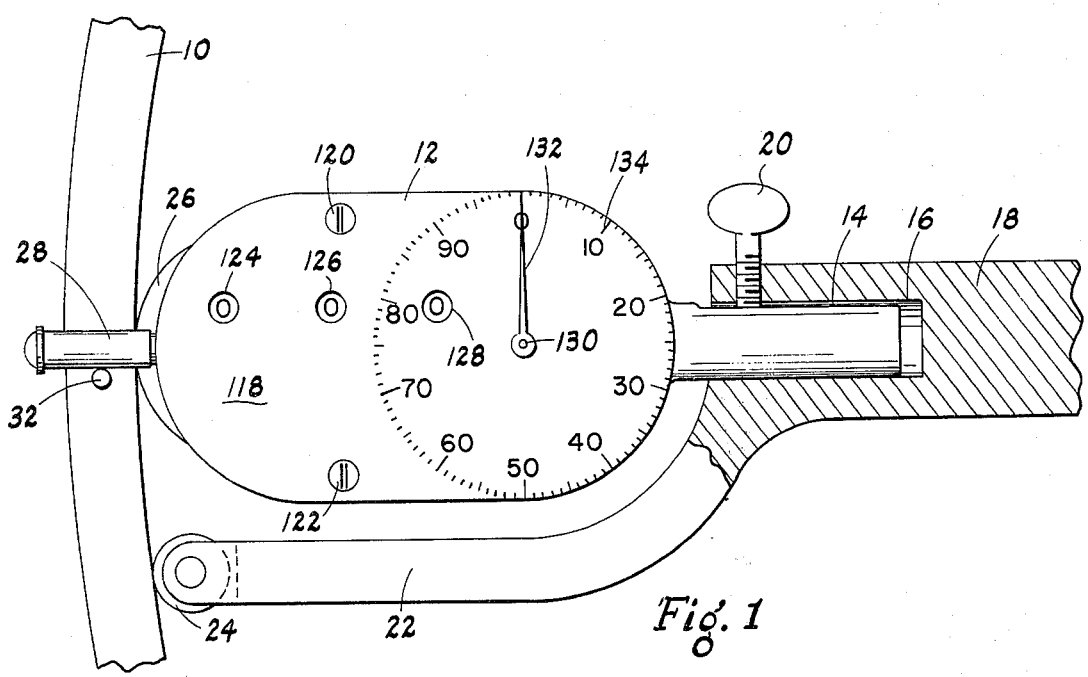
Fig. 1
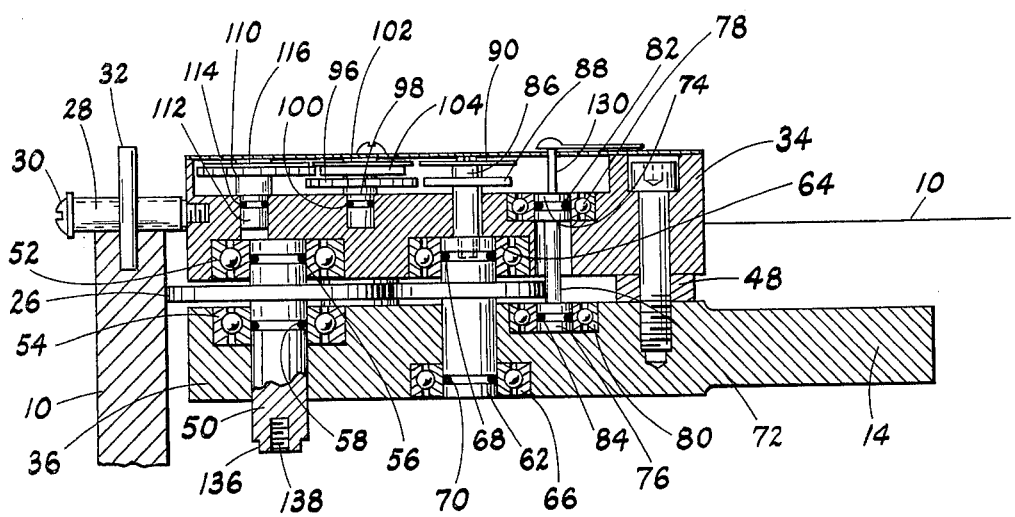
Fig. 3
Fig. 2

3,898,740

APPARATUS FOR DETERMINING THE DIAMETERS OF ROUND OBJECTS

BACKGROUND OF THE INVENTION

1. FIELD OF THE INVENTION

The present invention relates to an apparatus for measuring the diameter of a circular object and, more particularly, to a device capable of providing a direct reading of the diameter of the object. 2. Description of the Prior Art Many devices have been provided in the past for measuring linear distances and circumferences of round objects. However, with respect to those devices used for measuring the circumferences of round objects, only the circumferential distance has been provided and, therefore, it is necessary to convert the circumferential measurement into the corresponding diameter by calculation.

SUMMARY OF THE INVENTION

The present invention involves an apparatus for measuring the diameter of a circular object, especially an out-of-round pipe. The apparatus includes a contacting wheel which is adapted to contact the surface of the object whose diameter is to be measured, for example, the internal diameter of an out-of-round pipe. The contacting roller, in turn, is in peripheral engagement with a measuring roller, the latter having a diameter exactly equal to a multiple or submultiple of the standard of measurement in which the diameter is to be expressed. The measuring roller is also in peripheral contact with a second measuring roller which is preferably one-tenth of the diameter of the first measuring roller. The number of revolutions of the measuring roller is converted into the rotation of dials circumferentially numbered from zero through nine and which represent tenths, units and tens of the standard of measurement. The movement of the second roller is converted by means of the stationary dial and a movable pointer into thousandths of the standard of measurement.

BRIEF DESCRIPTION OF THE DRAWING

FIG. 1 is a plan view of the measuring apparatus of the present invention;

FIG. 2 is a side elevation of the apparatus shown in FIG. 1;

FIG. 3 is a vertical sectional view taken substantially along the longitudinal central axis of the device shown in FIG. 1;

DESCRIPTION OF PREFERRED EMBODIMENT

Figure 4:
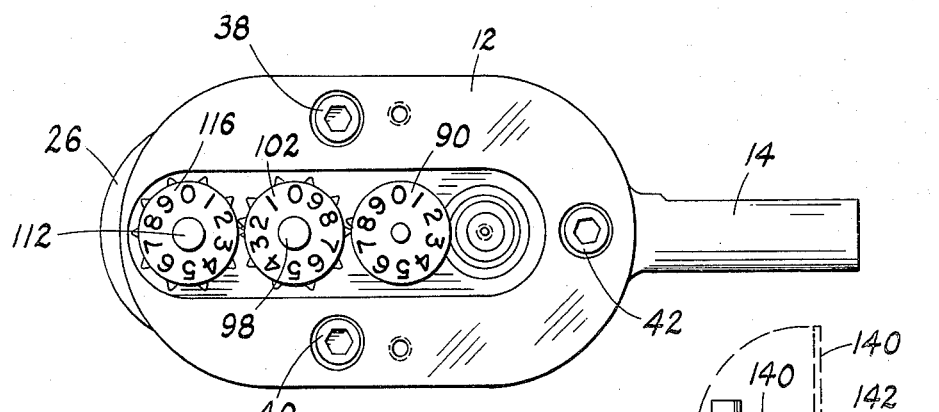
FIG. 4 is a plan view of the measuring apparatus shown in FIG. 1 minus the supporting arm and auxiliary rollers and with the pointer and outer flat plate removed.

Referring to the drawings in detail, FIG. 1 shows a portion of a pipe 10 whose internal diameter is to be determined. The device for determining the internal diameter of the pipe 10 comprises a tool 12 (the details of which will be described hereinafter) having an outwardly and rearwardly projecting shank 14 which is adapted to be received in an elongated cavity 16 of a handle member 18. The shank 14 is secured in the cavity 16 by means of a thumb screw 20 which is threadedly mounted in the handle portion 18 and which acts as a set screw against the shank 14. The handle member 18 is provided with a forwardly extending arm 22 at the end of which is mounted a roller 24 which is adapted to engage the inner surface of the pipe 10.

The tool 12 is also provided with a forwardly projecting roller 26 which is adapted to engage the inner surface of the pipe 10 and a small elongated roller 28 mounted at right angles to the roller 26, the roller 28 being adapted to engage the outer edge of the pipe 10 as best shown in FIG. 3. The roller 28 is mounted on a bearing screw 30 and may be removed entirely from the tool 12 as desired. In starting the tool around the inside of the pipe a removable pin 32 is adapted to be received in a suitable hole adjacent the roller 28; in fact, the roller 28 will bear against the pin 32. When it is desired to move the tool around the interior surface of the pipe 10 the tool 12 is positioned for its zero reading (as will hereinafter be explained) the roller 28 bearing against the pin 32; thereafter, the pin 32 is removed, the tool 12 is then moved around the internal surface of the pipe 32, the pin 32 in the meantime having been replaced, the operation continuing until the roller 28 again comes to rest against the pin 32. This will involve a complete circuit around the internal surface of the pipe 10.

Referring now to FIGS. 3, 4, 5 and 6, the tool 12 is divided into an upper member 34 and a lower member 36, from which the shank 14 projects. Members 34 and 36 are held together by means of bolts 38, 40 and 42 which passed through suitable holes in the upper member 34 and are threadedly received in suitable holes in the lower member 36. Spacers or washers 44, 46 and 48 are mounted on the bolts 38, 40 and 42, respectively, between the members 34 and 36 so as to secure the members 34 and 36 together in spaced relationship.

Figure 6:
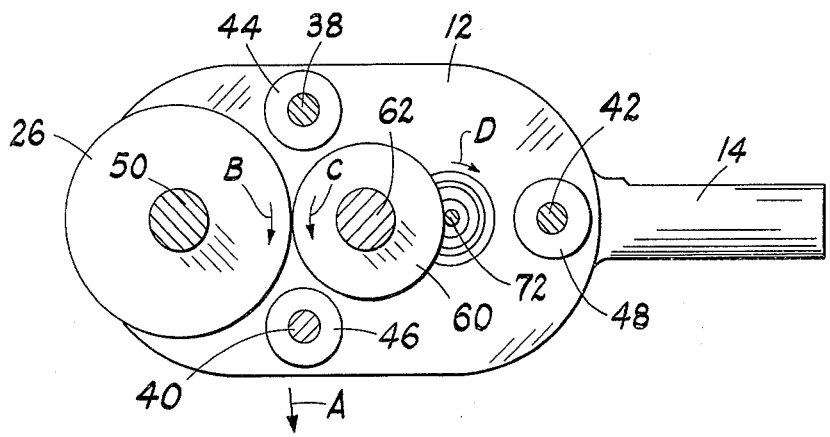
FIG. 6 is a horizontal sectional view through the space between the upper and lower members of the measuring devices.

As best shown in FIGS. 3 and 6, the roller 26 is a relatively thin disc which is integral with a shaft 50. The upper end of the shaft 50 is received within a bearing 52 which is accurately positioned in a properly sized opening at the bottom of the member 34. At the opposite side of the roller 26 from the bearing 52, the shaft 50 is also received within a lower bearing 54 which is also accurately positioned in a suitable opening in the upper surface of the lower member 36. The shaft 50 is preferably slightly smaller than the openings in the bearings 52 and 54, but is provided with annular grooves in which are mounted O-rings 56 and 58 which contact the inner surfaces of the bearings 52 and 54, respectively.

The roller 26 (which can be referred to as the "contacting" roller) engages the outer periphery of a second roller 60, which can be referred to as the "measuring" roller. The measuring roller 60 is preferably exactly one inch in diameter and is integral with the shaft 62. The shaft 62 is mounted for rotation in the members 34 and 36 in a manner similar to the shaft 50; the upper end of the shaft 62 is mounted in a bearing 64 which is exactly positioned within a suitable opening in the lower surface of the member 34; the lower end of the shaft 62 is suitably mounted within a bearing 66 which is exactly positioned within a suitable opening at the lower surface of the lower member 36. Again, the shaft 62 is somewhat smaller than the exact openings in the bearings 64 and 66; suitable grooves are provided in the shaft 62 and O-rings 68 and 70 are mounted in these grooves to bear against the inner surfaces of the bearings 64 and 66, respectively.

The outer surface of the roller 60 is adapted to engage the outer surface of an elongated roller or shaft 72 which is preferably exactly one-tenth of an inch in diameter. The upper and lower ends of the shaft 72 are provided with enlarged concentric portions 74 and 76 which are adapted to be received in bearings 78 and 80. The bearing 78 is exactly positioned within a suitable opening provided in the upper surface of the member 34 and the bearing 80 is exactly positioned within a suitable opening in the upper surface of the lower member 36. The concentric portions 74 and 76 are slightly smaller than the internal diameter of the bearings 78 and 80 and, again, these portions 74 and 76 are provided with annular grooves in which are mounted O-rings 82 and 84 which bear against the inner surfaces of the bearings 78 and 80, respectively.

The upper end of the shaft 62 is provided with an integral and smaller shaft 86 upon which are mounted a cam wheel 88 and a calibrated disc 90. The cam wheel 88 is provided with a single pointed cam member 92 which is adapted to engage, in succession, the points 94 on the star wheel 96. There are ten pointed teeth 94 evenly spaced around the circumference of the circumference of the star wheel 96. The star wheel is mounted on a stub shaft 98 which is suitably received in an opening provided at the top surface of the member 34. The stub shaft 98 is provided with a peripheral groove in which is mounted an O-ring 100 for the purpose of providing a frictional fit of the stub shaft 98 in its corresponding opening. At the upper end of the stub shaft 98 is provided a calibrated disc 102. A second cam wheel 104 is mounted on the stub shaft 98 between the calibrated disc 102 and the star wheel 96. The cam wheel 104 is provided with a single pointed cam 106 which is adapted to engage in succession the pointed teeth 108 on the star wheel 110. There are ten pointed teeth 108 evenly spaced around the circumference of the star wheel 110. The star wheel 110 is mounted on another stub shaft 112 which is received in a suitable opening in the upper surface of the member 34. The stub shaft 112 is provided with a peripheral groove in which is mounted an O-ring 114 to provide a friction fitting between the stub shaft 112 and its corresponding opening. At the upper end of the stub shaft 112 is mounted a calibrated disc 116.

A flat plate 118 is mounted on the upper surface of the member 34 and held thereon by means of threaded screws 120 and 122. The plate 118 is provided with three openings, 124, 126 and 128 through which it is possible to see the numerals on the calibrated discs 116, 102 and 90, respectively. The right-hand end of the plate 118 is provided with an opening through which projects a shaft 130, the latter being integral with an extension of the roller or shaft 72. On the outer end of the shaft extension 130 is mounted a pointer 132. The outer end of the pointer 132 is adapted to travel around the outside of a dial 134 imprinted on the surface of the plate 118 and which is divided into one hundred parts circumferentially.

OPERATION

If it is desired to measure the internal diameter of the pipe 10 using the device 12 shown in FIG. 1, it must be first ascertained that the readings through the openings 124, 126 and 128 are all at zero and that the pointer 132 is also in the zero position. The device 12 is placed against the inside of the pipe 10 such that the roller 28 is abutting against the pin 32. When operating the tool by hand, a handle portion 18 will be provided and the roller 24 should be in contact with the inner surface of the pipe 10 as shown in FIG. 1. The pin 32 is now removed and the device is moved against the inside of the pipe with the roller 26 in contact therewith in the direction of the arrow A shown in FIG. 6. This will cause the roller 26 to rotate in the direction shown by the arrow B in FIG. 6 and the roller 60 to rotate in the direction shown by the arrow C in FIG. 6. Also, the roller 72 will rotate in the direction represented by the arrow D in FIG. 6. After the roller 28 has cleared the opening for the pin 32, the pin is reinserted and the tool 12 is allowed to pass around the entire interior of the pipe 10 until the roller 28 again contacts the pin 32, at which point the readings are taken from the holes 124, 126 and 128 and the position of the pointer 132 is noted with respect to the dial 134. During the movement of the tool 12 around the interior of the pipe 10 the roller 26 will rotate the roller 60 which in turn will rotate the roller 72. Since the diameter of the roller 60 is exactly one inch, its circumference is exactly equal to $\pi$. Thus, when the dial 90 makes one complete revolution, the tool will have traveled $\pi$ inches. If, for example, the diameter of the pipe were thirty inches, the roller 26 would have traveled linearly exactly thirty $\pi$ inches; so also would the roller 60 have traveled linearly thirty $\pi$ inches. The dial 90 and the cam wheel 88 would have made exactly thirty revolutions. Since the pointed cam 92 on the cam wheel 88 contacts the star wheel once each revolution of the shaft 62, the cam 92 would have contacted the star wheel 96 thirty times; since the star wheel 96 has ten teeth such as the teeth 94, the star wheel 94 would have made exactly three revolutions. Thus, the readings through the openings 124 and 129 would both be zero representing the zero positions of the dials 102 and 90, respectively. However, since the star wheel 96 and its shaft 98 have made exactly three revolutions, the pointed cam 106 on the star wheel 104 would have contacted the points 108 on the star wheel 110 three times (the star wheel 110 also having ten of the points 108 thereon), the star wheel 110 would have been advanced three positions, thus placing the numeral 3 on the calibrated disc 116 beneath the opening 124. This would represent a reading of 30.0.

Each time that the measuring wheel 60 makes a complete revolution, the wheel or shaft 72 will make ten complete revolutions; conversely, when the shaft 72 has made one complete revolution, the measuring wheel 160 will have made only one-tenth of a revolution. This would represent a reading of 1 through the opening 128 with the pointer 132 being at the zero position. Since the dial 134 is divided into 100 parts it is possible to measure and read the diameter of a pipe exactly to the thousandths of an inch.

FURTHER DESCRIPTION

The diameter of the contacting wheel 26 is not important as far as the present invention is concerned, because this wheel merely imparts a linear movement to the measuring wheel 60. The diameter of the measuring wheel 60, however, is of utmost importance, as is also the diameter of the smaller measuring wheel 72. If we are using the English system, it is imperative that the diameter of the measuring wheel 60 be exactly one inch or an exact multiple or sub-multiple of one inch. For example, if the diameter of the measuring wheel 60 were exactly two inches, the calibrated disc 90 could be subdivided into twenty graduations, going from zero through nine and zero through nine again with the cam wheel 88 being provided with two cam projections 92; similarly, if it were desired to make the wheel 60 exactly one-half inch, then some reduction gearing would have to be provided at the top of the shaft 62 to translate two revolutions of the shaft 62 into one revolution of the cam wheel 88 and the calibrated disc 90.

If it were desired to make the tool 12 to read in metric units, the diameter of the measuring wheel 60 would be an exact sub-multiple of one meter; where necessary, and depending upon the particular sub-multiple selected, gearing could be provided to make the dials 116, 102 and 90 read directly in meters or fractions thereof.

It was mentioned previously that the diameters of the shafts 50, 62 and the shaft extensions 74 and 76 were slightly smaller than the openings in the corresponding bearings in which they were mounted. It should also be pointed out that the openings for the bearings 52 and 54 are machined in such a way with respect to the machined openings for the bearings 64 and 66 that the center to center distance between these bearing openings is slightly less than the combined radial measurements of the wheels 26 and 60; this means that the shafts 50 and 62 will ride very slightly eccentrically within the bearing openings, but in a manner urging the outer surface of the roller 26 into greater contact with the outer surface of the roller 60. This arrangement is possible by virtue of the O-rings mounted on the shafts 50 and 62. The same considerations hold true for the shaft 62 and the shaft 72. The openings for the respective bearings of the shafts 62 and 72 are machined in such a manner that this type of intimate contact is effected between the outer edge of the roller 60 and the outer surface of the roller 72. This intentional offsetting should not, preferably, exceed three-thousandths of an inch. It is also contemplated within the spirit of this invention, where desired, to use knurled surfaces on the outer edges of the rollers 26, 60 and 72.

The invention has been illustrated in particular relation to a hand-operated tool. It is contemplated that the device 12 could be mounted on the end of an arm which would be rotated mechanically in which case it would be unnecessary to use the guide roller 24. Also, in such instances, the roller 28 could be eliminated, by merely unscrewing the screw 30, providing some other means is used to index the instrument at starting and at finish.

There may be circumstances wherein it is undesirable, inconvenient, or otherwise impossible to place the device 12 within the opening of the pipe 10. In such a case, it should be noted that the lower end of the shaft 50 in FIG. 3 is is provided with a shoulder 136 and a threaded opening 138. Undeer the conditions called for above, it would be possible, therefore, to place another wheel of exactly the same size as the wheel 26 on the lower end of the shaft 50 over the shoulder 136 and to secure such a roller to the lower end by means of a bolt or screw which would fit into the threaded opening 138. Thus, the added wheel would merely bear against the inner edge of the opening of the pipe 10 with the remainder of the device 12 being wholly outside of the opening in the pipe 10.

As indicated above, the important or significant roller is the measuring roller 60; in this regard it should be mentioned that the measuring device of the present invention could operate with a single roller such as the roller 60 and this roller could be in direct contact with the surface to be measured. Also, the smaller measuring roller 72 could be eliminated and replaced by a step-up gear combination responsive to the rotation of the shaft 62 to produce the decimal readings similar to that achieved by the movement of the needle 132 over the dial 134. However, the present arrangement eliminates the need for any gearing as such and is to be preferred. Furthermore, the use of the contacting roller 26 as the means for providing the initial contact between the measuring device and the surface to be measured permits the replacement of this roller 26 whenever the same becomes worn. Although the diameter of the measuring roller 60 is critical, the diameter of the contacting roller 26 is not, as explained above. Thus, the replacement of the roller 26 would involve less expense when compensating for wear. The roller 60 could be made of stainless steel or other metal having a high resistance to wear and abrasion, whereas the roller 26 could be made intentionally less wear resistant than the roller 60. Also, it is possible that the roller 26 could be covered with a layer of Teflon or the like which, itself, could be replaced under conditions of wear.

If, for example, a device were constructed with a single roller 60 (eliminating the rollers 26 and 72) it is most likely that the dials which indicate the measurement of diameter would have to be arranged in a line at right angles to the arrangement of the dials as shown in FIG. 4, and, even then, these dials would have to be gear driven, in part at least. Such an arrangement of dials is not believed to be convenient from the standpoint of ease of reading. Furthermore, the device would have to be much wider than it is long, thereby creating some possible problems in the matter of handling the measuring device itself. Of course, it would be possible to eliminate the roller 26 only and still retain the smaller roller 72, but it is believed that this would have to be moved to a location ninety degrees removed from that shown in FIG. 6 (i.e. ninety degrees with respect to the center of the shaft 62).

Figure 7:
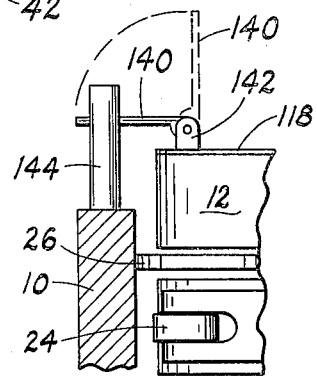
FIG. 7 is a fragmentary side elevation similar to FIG. 2, but on a reduced scale, and showing a modified indexing means.
Figure 5:
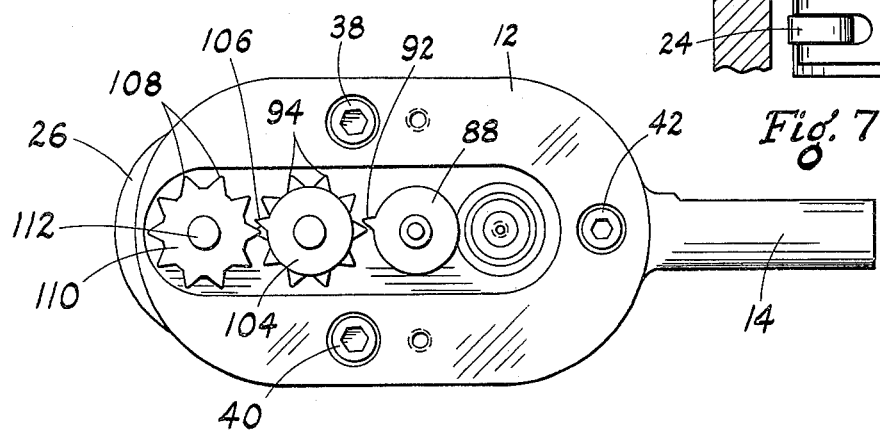
FIG. 5 is a plan view similar to FIG. 4 but with the measuring dials removed.

FIG. 7 shows an indexing means which can be used in place of the indexing roller 28. A hinged pointer 140 is pivotally mounted between a pair of spaced and upwardly projecting arms 142 (only one of which is shown in FIG. 7), these arms 142 being secured to the upper flat plate 118. The indexing pointer could be used in conjunction with thee removable pin 32 previously described; however, there may be circumstances where the removable pin 32 is not practical because of possible damage to the part being measured by drilling a hole in the same. Therefore, a removable object, such as the object 144, could be placed on the edge of the pipe 10 as shown and secured to the pipe by means of glue, other suitable bonding material or by a piece of adhesive tape (not shown); alternatively, the object 144 could be a magnet provided that the pipe 10 is made of iron or steel or similar material. At any event, with the pointer 140 in the solid line position shown in FIG. 7, the measuring apparatus 12 is indexed in the zero position with the pointer 140 resting against the rear edge of the object 144. Thereafter, the pointer can be pivoted to the dotted line position shown, after which the measuring apparatus 12 is caused to move around the inner surface of the pipe in the manner described above until the indexing pointer 140 (now returned to the solid position shown in FIG. 7) comes to rest again on the rear edge of the object 144. If desired, the pointer 140 could be further pivoted from the dotted line position shown in FIG. 7 rearwardly until it rests against the surface of the flat plate 118.

The apparatus of the present invention has been described in particular relation to the measuring of the internal diameter of a pipe, especially an out-of-round pipe. However, it should be obvious that the apparatus of the present invention could be employed to measure the diameter of any circular object; also, the device could be used on external circular surfaces aswell as internal circular surfaces.

Whereas the present invention has been described in particular relation to the drawings attached hereto, it should be understood that other and further modifications, apart from those shown or suggested herein, may be made within the spirit and scope of this invention.

What is claimed is:

1. Apparatus for measuring the diameter of a circular object comprising a measuring device adapted to bear against and move along the surface whose diameter is to be measured, a measuring roller mounted on a first shaft for rotation in said measuring device and having a diameter exactly equal to a multiple or sub-multiple of the standard of measurement in which the diameter is to be expressed, said measuring wheel being adapted to move circumferentially exactly the same amount as the movement of said measuring device over the full circumference of the surface whose diameter is to be measured, means for translating the number of revolutions of said measuring roller into the exact diametral measurement of said object, a second shaft mounted for rotation in said measuring device, a contacting roller mounted on said second shaft and having an outer periphery adapted to contact said surface and contacting the outer periphery of said measuring roller whereby said contacting roller is in driving relationship with respect to said measuring roller, a third shaft mounted for rotation in said measuring device, a second measuring roller keyed to said third shaft and having its outer periphery engaging the outer periphery of the first mentioned roller whereby said first measuring roller is in driving relation with respect to said second measuring roller, the diameter of said second measuring roller being an exact sub-multiple of the diameter of said first measuring roller, wherein the shaft of said first measuring roller and the shaft of said contacting roller are mounted respectively in bearings in said measuring device where the center-to-center distance between these respective bearings is slightly less than the combined radial measurements of said contacting roller and said first measuring roller and wherein the shaft of said second measuring roller is mounted for rotation in a bearing in said measuring device, the center-to-center distances between the bearings for the shafts of said first and second measuring rollers being slightly less than the combined radial measurements of said first and second measuring rollers, all of said shafts being resiliently mounted in their respective bearings, whereby positive contact is assured in said driving relationships.

* * * * *